UNITED STATES PATENT OFFICE.

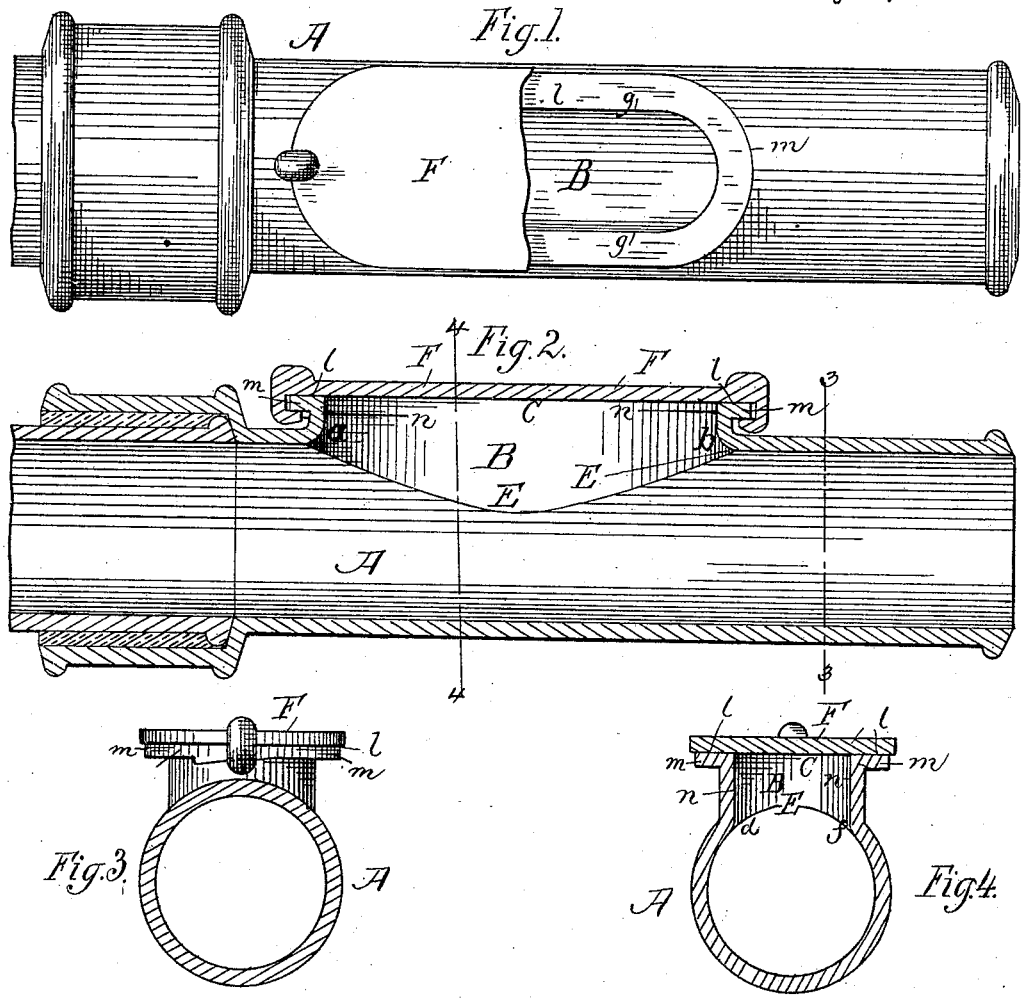

JAMES BARRETT, OF BOSTON, MASSACHUSETTS.

SOIL AND WASTE PIPE.

SPECIFICATION forming part of Letters Patent No. 277,196, dated May 8, 1883.

Application filed January 20, 1883. (No model.)

*To all whom it may concern:*

Be it known that I, JAMES BARRETT, of Boston, in the county of Suffolk and State of Massachusetts, have invented certain new and useful Improvements in Soil and Waste Pipes, &c., of which the following is a full, clear, and exact description.

Soil, waste, and drain pipes of houses and other buildings, as well known, are provided with hand-holes at intervals, so that the pipes may be entered to free or clear them of obstructions without necessarily breaking their continuity, said hand-holes being provided with covers or lids preferably packed against the escape of obnoxious gases or effluvia. In some cases these hand-holes consisted simply of round openings extending directly through the side of the pipe at right angles to its length, or of a single passage at an acute angle to the length of the pipe, or, as shown and illustrated in the Letters Patent of the United States issued to me, dated August 29, 1882, No. 263,461, of two of said round passages running in opposite directions and at an acute angle to the length of the pipe, opening to the interior of the pipe, however, at or about the same part thereof. Round hand-holes entering pipes at right angles to their length obviously would only allow the pipe to be cleaned for a very short length of the pipe from the hand-hole in either direction—in fact, only substantially just at and about the hole—whereas with a single round passage entering the pipe at an acute angle to its length the pipe can be cleaned for a great length from such passage, but only in one direction, and that in the direction of the passage. By combining two of such angular passages as in the Letters Patent aforesaid the pipe at its part where said passages are located was capable of being cleaned to a great length in opposite directions, thus doubling the advantage of the one angular passage, as previously arranged, over a round passage or hole opening into the pipe at a right angle thereto. While with two of said angular passages great advantages were secured, still their attainment was attended with the serious disadvantage that two holes or passages were required to be closed by a cover for each instead of one, as heretofore. This disadvantage is overcome by the present invention, which consists in providing the pipe with a passage leading directly into the interior of the pipe from one side thereof, which passage has communication with the pipe at its inner periphery in an opening thereof which is of a greater dimension as to the length than as to the width or diameter of the pipe, and has communication with the pipe at its outer periphery in an opening which has its center point coincident or substantially coincident with the center point of the elongated opening at the inner periphery of the pipe, and also is suitably constructed for being closed by a cover or lid, all substantially as hereinafter described, reference being had to the accompanying plate of drawings, in which—

Figure 1 is a plan view of a section of a soil or drain pipe, showing my improved hand-hole passage and its cover, the latter being removed in part, so as to expose corresponding to such removed part of the cover of the hand-hole passage. Fig. 2 is a central longitudinal section on line 2 2, Fig. 1; Figs. 3 and 4, cross-sections on line 3 3 and 4 4, respectively, of Fig. 2.

In the drawings, A is a section of a soil-pipe of the ordinary construction except as to this invention. B is a passage through one side of the pipe. This passage B is the hand-hole passage, and it has an opening, C, at the outer periphery, and an opening, E, at the inner periphery of the pipe, and between the two openings the passage B is continuous, and the center points of the two openings C and E are substantially coincident with a line running at right angles to the length of the pipe. The opening E, at the inner periphery of the pipe, extends along the length and across the width of the pipe, and in the length of the pipe it is of a greater dimension than in the width of the pipe, as shown by comparing the distance from *a* to *b* in Fig. 2, which is the length of the opening, and the distance from *d* to *f* (in Fig. 3) which is the width of the opening. In width the opening is equal, or substantially so, to the diameter of the pipe, and in length of the opening considerably in excess of the diameter of the pipe, and the periphery or edge *g* of the opening is suitably shaped, as seen in Fig. 1, to produce the same. The passage B at the outer periphery, C, of the pipe, as before stated, has its center point coincident with a right line through it and the center point of the opening E at the inner periphery of the pipe, and, as shown, it is surrounded with a face, l, and flange m, both adapted for the reception and fastening of a cover or lid, F, in any of the usual modes. As shown, the outer opening, C, is elongated substantially as the inner opening, E, but contracted a little in length and breadth, and this contraction might be made greater, bringing the outer opening more or less to a round shape, in lieu of an elongated or oval shape, as particularly shown; but in any event the walls n of the passage B, between the outer and inner openings, continue in such lines from one to the other as to afford no obstruction to the use of the elongated inner opening, E, to the full length thereof, in the cleaning of the pipe through the same. By having an elongated opening, E, at the inner periphery of the pipe, and a passage leading thereto which opens to the outside of the pipe, and such passage so shaped as to offer no obstruction to the use of the elongated inner opening, E, to the full length thereof, it is plain that a single hole can be and is secured in the pipe which has all the advantages for cleaning the pipe through it of two oppositely-arranged angular hand-holes, such as described and shown in the Letters Patent aforesaid, and without the disadvantage of two separate and distinct holes to be covered.

Having thus described my invention, what I claim, and desire to secure by Letters Patent, is—

In a soil or drain pipe, the passage B through its side, having an elongated opening, E, at the inner periphery of the pipe, and an opening, C, at the outer periphery of the pipe, constructed for the reception and attachment of a cover thereto, substantially as described, for the purpose specified.

In testimony whereof I have hereunto set my hand in the presence of two subscribing witnesses.

JAMES BARRETT.

Witnesses:
EDWIN W. BROWN,
WM. S. BELLOWS.